United States Patent
Prytz et al.

(10) Patent No.: US 12,205,060 B2
(45) Date of Patent: Jan. 21, 2025

(54) SYSTEM AND METHOD FOR DEPICTION AND COUNTING OF EXTERNAL STRUCTURES ON A FISH

(71) Applicant: SUBC3D AS, Haugesund (NO)

(72) Inventors: Frank Robert Wiik Prytz, Hafrsfjord (NO); Bjørn Grøtting, Stavanger (NO)

(73) Assignee: SUBC3D AS, Haugesund (NO)

( * ) Notice: Subject to any disclaimer, the term of this patent is extended or adjusted under 35 U.S.C. 154(b) by 300 days.

(21) Appl. No.: 17/617,846

(22) PCT Filed: Jun. 18, 2020

(86) PCT No.: PCT/NO2020/050168
§ 371 (c)(1),
(2) Date: Dec. 9, 2021

(87) PCT Pub. No.: WO2020/256566
PCT Pub. Date: Dec. 24, 2020

(65) Prior Publication Data
US 2022/0245555 A1    Aug. 4, 2022

(30) Foreign Application Priority Data
Jun. 19, 2019  (NO) .................................. 20190760

(51) Int. Cl.
*G06K 9/00*    (2022.01)
*A01K 61/10*    (2017.01)
(Continued)

(52) U.S. Cl.
CPC ....... *G06Q 10/06395* (2013.01); *A01K 61/10* (2017.01); *A01K 61/60* (2017.01); *G06Q 50/02* (2013.01); *G06V 20/05* (2022.01)

(58) Field of Classification Search
CPC .............................. A01K 61/13; A01K 61/60
See application file for complete search history.

(56) References Cited

U.S. PATENT DOCUMENTS

2013/0050465 A1*  2/2013  Beck ...................... A01K 61/10
                                                    348/81
2013/0223693 A1   8/2013  Chamberlain et al.
(Continued)

FOREIGN PATENT DOCUMENTS

CN    109856138    6/2019
EP    2531022     12/2012
(Continued)

OTHER PUBLICATIONS

Norwegian Search Report for NO 20190760, dated Jan. 16, 2020.
(Continued)

*Primary Examiner* — Gregory A Morse
*Assistant Examiner* — Owais Iqbal Memon
(74) *Attorney, Agent, or Firm* — Andrus Intellectual Property Law, LLP (57) ABSTRACT

A system is for in-situ monitoring and recording of fish health of fish in a fish cage. The system has at least one camera housing. The camera housing is provided with a camera group having at least two cameras arranged to take synchronized pictures for digital close-range photogrammetry. The system has a central data-processing unit, the central data-processing unit being arranged to calculate a three-dimensional model of an object photographed synchronously by the at least two cameras. The data-processing unit is arranged to report the number of structures deviating from the smooth surface of the object in the three-dimensional model.

17 Claims, 9 Drawing Sheets

(51) Int. Cl.
*A01K 61/60* (2017.01)
*G06Q 10/0639* (2023.01)
*G06Q 50/02* (2012.01)
*G06V 20/05* (2022.01)

(56) References Cited

U.S. PATENT DOCUMENTS

| | | | |
|---|---|---|---|
| 2018/0132459 A1 | 5/2018 | Baba et al. | |
| 2018/0303073 A1 | 10/2018 | Jans et al. | |
| 2020/0113158 A1* | 4/2020 | Rishi | G06T 7/20 |
| 2020/0267947 A1* | 8/2020 | Krossli | A01K 61/95 |
| 2020/0281168 A1* | 9/2020 | Hellesøe | H02S 10/40 |

FOREIGN PATENT DOCUMENTS

| | | | | |
|---|---|---|---|---|
| JP | 2018078814 A | 5/2018 | | |
| NO | 20121541 | 6/2014 | | |
| NO | 20161167 | 1/2018 | | |
| WO | WO-2009008733 A1 * | 1/2009 | | A01K 61/001 |
| WO | 2010054041 | 5/2010 | | |
| WO | 2014098614 | 6/2014 | | |
| WO | 2016070297 | 5/2016 | | |
| WO | 2017001971 | 1/2017 | | |
| WO | 2017204660 | 11/2017 | | |
| WO | 2018011745 | 1/2018 | | |
| WO | 2018111124 | 6/2018 | | |
| WO | 2018117856 | 6/2018 | | |
| WO | 2018212665 A1 | 11/2018 | | |
| WO | 2019008330 | 1/2019 | | |

OTHER PUBLICATIONS

International Search Report and the Written Opinion for PCT/NO2020/050168, dated Oct. 5, 2020.
Response to the Written Opinion for PCT/NO2020/050168, dated Apr. 13, 2021.
International Preliminary Report on Patentability for PCT/NO2020/050168, dated Jun. 1, 2021.
Bruno, et.al.—Experimentation of structured light and stereo vision for underwater 3D reconstruction.
Purser, et.al.—Ocean Floor Observation and Bathymetry System (OFOBS): A New Towed Camera/Sonar System for Deep-Sea Habitat Surveys.
Rongzing, et.al.—Quantitative Photogrammetric Analysis of Digital Underwater Video Imagery.

* cited by examiner

SYSTEM AND METHOD FOR DEPICTION AND COUNTING OF EXTERNAL STRUCTURES ON A FISH

CROSS-REFERENCE TO RELATED APPLICATIONS

This application is the U.S. national stage application of International Application PCT/NO2020/050168, filed Jun. 18, 2020, which international application was published on Dec. 24, 2020, as International Publication WO 2020/256566 in the English language. The International Application claims priority of Norwegian Patent Application No. 20190760, filed Jun. 19, 2019. The international application and Norwegian application are both incorporated herein by reference, in entirety.

FIELD

The invention relates to a system for depicting structures in water. More specifically, the invention relates to a system comprising cameras arranged for digital close-range photogrammetry and a data-processing unit which calculates a three-dimensional model of an object which has been photographed by the cameras. More specifically still, the invention relates to the data-processing unit being arranged to record and count structures deviating from a smooth surface of the object. The object may be a live fish which is swimming freely past the cameras without being in a channel or some other guiding device. More specifically still, a recorded structure may be an external crustacean parasite such as a salmon louse. A recorded structure may alternatively consist of damage to the skin of the fish. Cameras and the data-processing unit may be arranged to report the dimension of the structure or parts of the structure. The system provides continuous monitoring and recording of the number of external crustacean parasites in a fish cage.

BACKGROUND

Fish-farming may take place in facilities floating on a water surface. The facility may comprise several enclosures, each enclosure being closed in the sense that the fish cannot swim or jump out of the enclosure. The enclosure may comprise open walls which consist of a net, and an open bottom which consists of a net. An enclosure like that is called an open fish cage. The enclosure may alternatively comprise tight walls and a tight bottom. An enclosure like that is called a closed fish cage. In what follows, the term fish cage will be used for both an open fish cage and a closed fish cage, if it is not clear from the context that it is either an open fish cage or a closed fish cage.

The salmon (*Salmo salar*) and the rainbow trout (*Oncorhynchus mykiss*) have a spotted skin surface and spotted scales, especially on the dorsal side. External fish parasites, such as salmon lice (*Lepeophtheirus salmonis*), are flat. The stuck chalimus I and chalimus II stages of salmon lice are from approximately 1 mm to approximately 2.3 mm long. These stages are difficult to recognize and identify by image recognition when they are sitting on a fish skin. In the mobile pre-adult I stage, salmon lice are approximately 3.6 mm long. These, too, are difficult to recognize and identify by image recognition. The pre-adult II stages are approximately 4.3 to 5.2 mm long. The adult stages are easier to recognize and identify by image recognition as adult males are approximately 5-6 mm long and adult females are approximately 8-12 mm long. Males and females are then so large that they stand out from the spot pattern of salmon and rainbow trout. In addition, adult salmon lice are different in colour from the skin of the fish.

External fish parasites are a problem in fish-farming in cages.

The patent document WO2018011745 discloses a channel through which the fish swims. A fish-health scanner comprises two imaging devices in the form of cameras. Fish health and fish well-being are recorded for fish swimming through the channel. Data acquired from the cameras undergo an image analysis to identify features of fish and to characterize health condition.

The patent document EP2531022 discloses a system comprising a camera connected to an image-recognition system. A control system directs a laser pulse at an area on a fish that exhibits a difference in contrast that is typical of parasites on the surface of the fish. The camera can image the fish while it is swimming through a pipe.

SUMMARY

The invention has for its object to remedy or reduce at least one of the drawbacks of the prior art or at least provide a useful alternative to the prior art.

The object is achieved through the features that are specified in the description below and in the claims that follow.

The invention relates to the use of digital close-range photogrammetry. More particularly, the invention relates to the use of a system comprising several cameras. The system may also comprise one or more light sources. The cameras and the light source are adapted for use in water. The system may further be connected to an underwater vehicle which can move around autonomously in the entire enclosed volume of a fish cage. The system may further comprise a charging station which is submerged in the fish cage. The charging station is supplied with electrical energy from an energy source outside the fish cage. The underwater vehicle will seek out the charging station for electrical energy to be transmitted. The underwater vehicle will also be staying at the charging station when the underwater vehicle is not moving around in the fish cage. The charging station may be arranged to transmit data from the system to a central data-processing unit.

The system may comprise one camera group. Each camera group comprises at least two cameras. Each camera of the camera group takes synchronized pictures of an object within the fish cage. The at least two cameras of the camera group have the same optics and resolution. The synchronized images from the identical cameras are processed by the central data-processing unit, and the data-processing unit creates a three-dimensional model of the object that has been photographed. The camera may be a video camera. The frames in the recording of the video camera are processed by the central data-processing unit, and the data-processing unit creates a three-dimensional model of the object that has been filmed. The data-processing unit may process data from synchronized frames from two video cameras.

The system may comprise several camera groups. Each camera group may point in a different direction relative to the other camera groups.

One of the cameras of each camera group may be a video surveillance camera. The video surveillance camera may film with a larger viewing angle than the other cameras in the camera group. Data from the video surveillance camera are not used in calculating the three-dimensional model of the object.

The light source is adapted for giving a light spectrum which is suitable for imaging objects in water. The lighting intensity may be adjustable. The light may be a flashlight.

The system may comprise sensors for orientation, such as an inclinometer, a compass and a gyrocompass. The system may further comprise other sensors for measuring physical properties of the water and of the surroundings, such as an oxygen sensor, a temperature sensor, a depth sensor, a photo sensor and a salinometer.

The system may comprise means for wireless communication when the underwater vehicle is moving around in the fish cage. Video signals from the video surveillance camera may be transmitted wirelessly and in real time. The images transmitted from the video surveillance camera may monitor the feeding-out of feed pellets. The images transmitted from the video surveillance camera may be used to inspect a net wall in the fish cage.

The invention also relates to positioning several underwater vehicles, each provided with one or more camera groups, in the same fish cage. The underwater vehicles may be arranged to communicate with each other. There may be several charging stations in one fish cage.

The system may be arranged to position the underwater vehicle in the fish cage relative to where the fish are staying in the fish cage and to record the swimming direction of most of the fish in the fish cage.

The underwater vehicle may be arranged to be connected to a cable. This may be advantageous when the system is to be used for inspecting the net wall in the fish cage and for inspecting anchoring lines and other elements of the anchoring of the fish cage.

The underwater vehicle may be provided with means of floating up to a water surface. This may be advantageous if a fault arises, or if the underwater vehicle does not find the way to the charging station.

The invention is defined by the independent claims. The dependent claims define advantageous embodiments of the invention.

In a first aspect, the invention relates, more specifically, to a system for in-situ monitoring and recording of fish health of fish in a fish cage, the system comprising at least one camera housing. The camera housing is provided with a camera group comprising at least two cameras arranged to take synchronized pictures for digital close-range photogrammetry; the system comprises a central data-processing unit, the central data-processing unit being arranged to calculate a three-dimensional model of an object photographed synchronously by the at least two cameras; and the data-processing unit is arranged to report the number of structures deviating from the smooth surface of the object in the three-dimensional model.

The camera may be a video camera.

The camera group may comprise a video surveillance camera. The camera housing may comprise two camera groups. The camera housing may be attached to an underwater vehicle. The underwater vehicle may be an autonomous underwater vehicle. The system may comprise at least two camera housings attached to the underwater vehicle.

The system may comprise communication means for wireless transmission of acquired data from the at least two cameras to the central data-processing unit.

A fish cage may be provided with a system as described in the foregoing. The fish cage may be provided with a charging station for the underwater vehicle. The fish cage may be provided with two underwater vehicles, and each underwater vehicle may be provided with at least one camera housing.

In a second aspect, the invention relates, more specifically, to a method for in-situ monitoring and recording of fish health of fish in a fish cage. The method comprises the steps of:
providing a system as described in the foregoing;
synchronously photographing an object in the fish cage with the cameras of the camera group;
processing the data acquired from the system in the central data-processing unit;
calculating a three-dimensional model of the photographed object in the fish cage;
analysing the three-dimensional model for structures deviating from the smooth surface of the object and counting the number of such structures; and
reporting the number of such structures.

The method may further comprise calculating and reporting the size of the structures.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

In the figures, the reference numeral 1 indicates a system according to the invention. The system 1 comprises a camera group 2 which is positioned in a camera housing 3. The camera group 2 comprises at least two identical cameras 21 adapted for imaging an object 5 based on digital close-range photogrammetry. The camera 21 may be a video camera. The camera group 2 is shown with a video surveillance camera 23. In the figures, four identical cameras 21 are shown in the camera group 2. The camera group 2 may comprise three identical cameras 21. The camera group 2 may comprise five identical cameras 21. The system 1 may comprise a plurality of camera housings 3, and each camera housing 3 is provided with one camera group 2.

The camera housing 3 is watertight. The camera housing 3 is provided with a window 31 admitting light for the cameras 21 and the video camera 23. The camera housing 3 may have an outer shape that is adapted to the number of cameras 21, 23 in the camera group 2.

The video surveillance camera 23 is shown positioned centrally in the camera group 2. The video surveillance camera 23 may have a different position from that shown in the figures relative to the other identical cameras 21.

Figure 1:
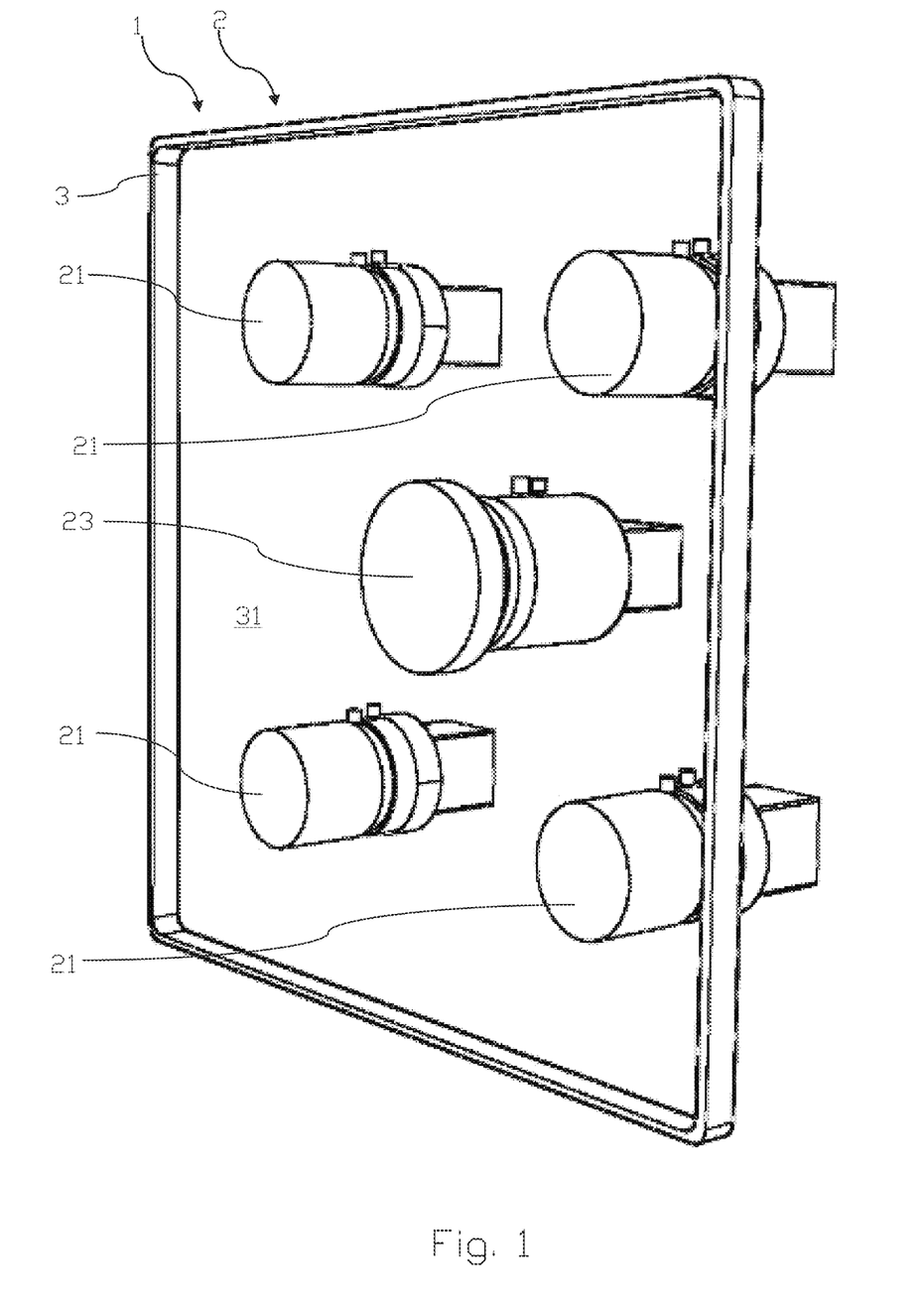
FIG. 1 shows a camera group schematically, the camera group being viewed from the front.
Figure 2:
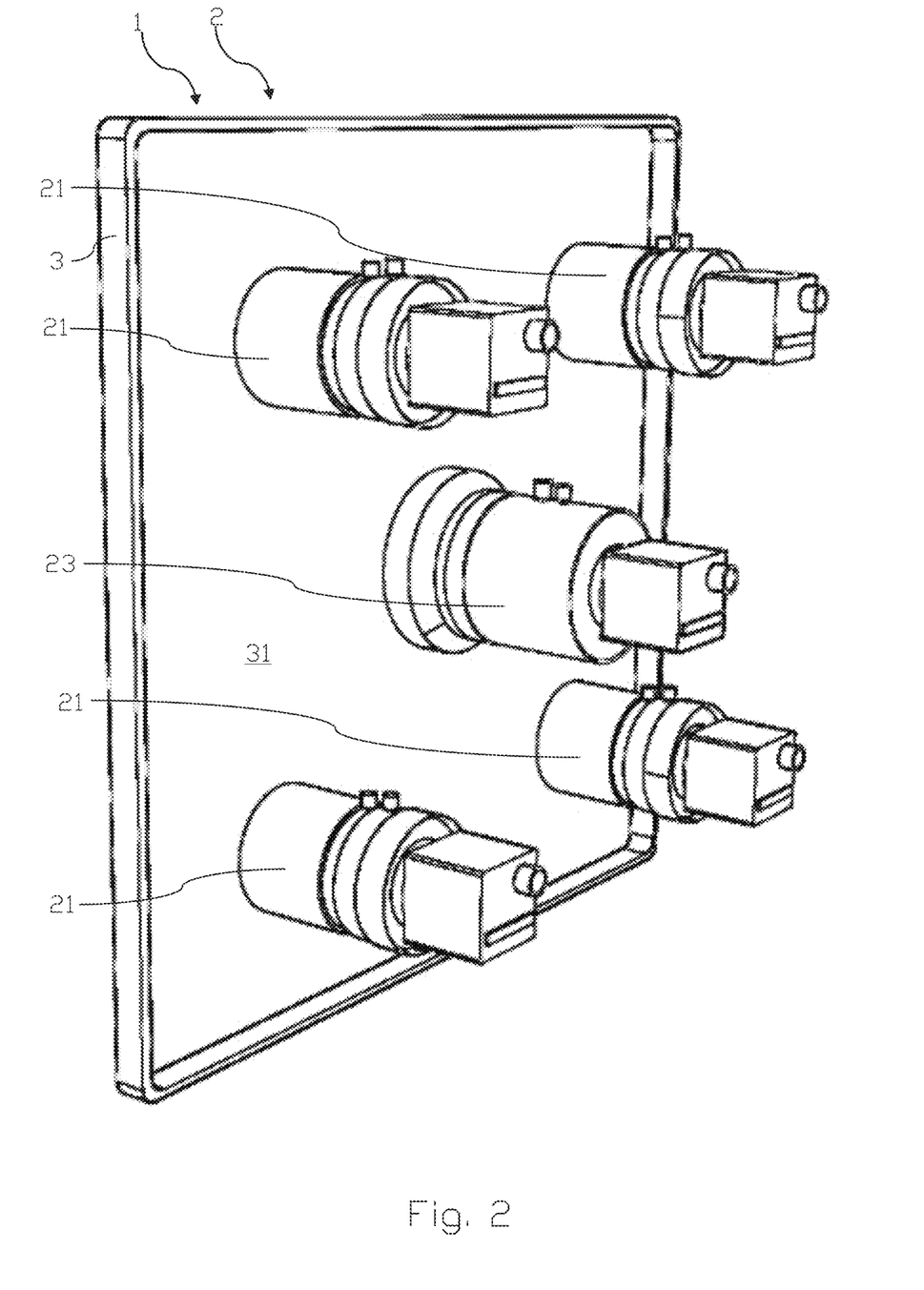
FIG. 2 shows, on the same scale as FIG. 1, the camera group viewed from behind.
Figure 3:
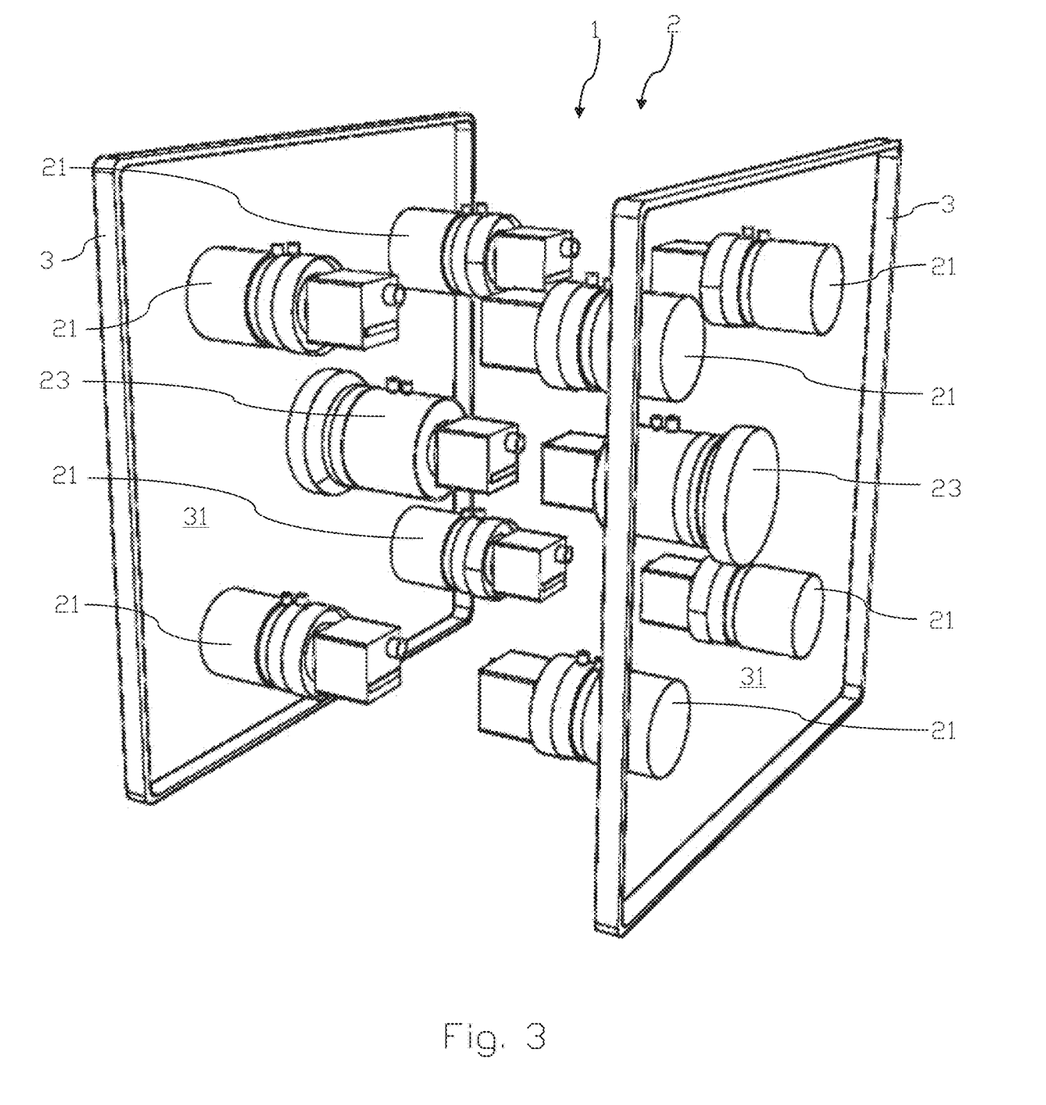
FIG. 3 shows, on a slightly smaller scale than FIG. 1, two camera groups pointing in different directions.

FIG. 3 shows schematically two camera groups 2 in one camera housing 3. The camera groups 2 are pointing in different directions.

The system 1 further comprises a central data-processing unit 7. Data from the cameras 21 are transmitted to the central data-processing unit 7. The central data-processing unit 7 is arranged to form a three-dimensional model 6 of an object 5 which has been photographed synchronously by the cameras 21 of the camera group 2. In an alternative embodiment, the central data-processing unit 7 may be arranged to form a three-dimensional model 6 of an object 5 which has been filmed by the cameras 21 of the camera group 2 by using synchronized frames from the video cameras.

Figure 9:
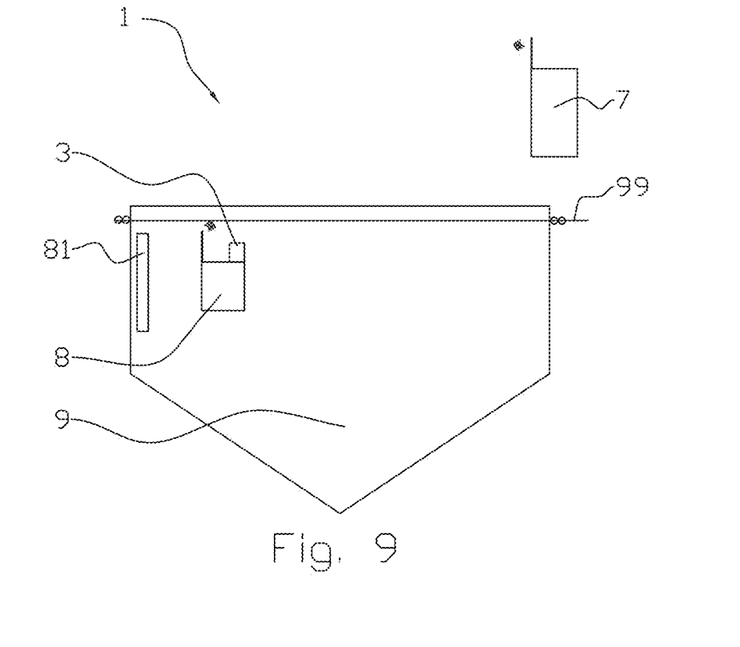
FIG. 9 shows the system according to the invention schematically.
Figure 10:
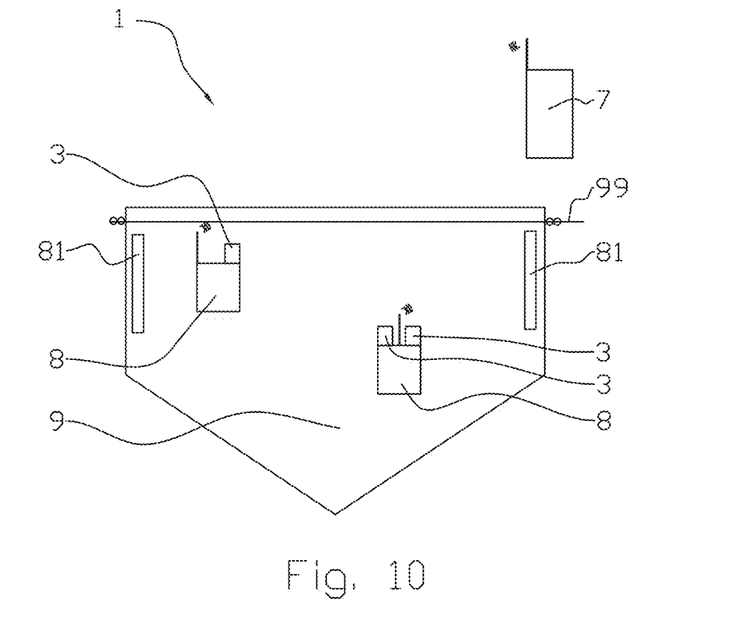
FIG. 10 shows the same as FIG. 9 in an alternative embodiment.

The system 1 may also comprise an underwater vehicle 8 which is positioned inside a fish cage 9 for farming fish (not shown). The fish cage 9 is floating in a water surface 99 as shown in FIGS. 9 and 10. The underwater vehicle 8 may be an autonomous underwater vehicle 8. The fish cage 9 may be provided with a charging station 81 which is supplied with electrical energy from an energy source (not shown) outside the fish cage 9. The charging station 81 may be arranged to transmit data from the cameras 21 of the camera group 2 to the central data-processing unit 7.

In an alternative embodiment, the underwater vehicle 8 is arranged to transmit data wirelessly from the cameras 21 of the camera group 2 to the central data-processing unit 7. In a further alternative embodiment, a plurality of underwater vehicles 8 may be positioned in the same fish cage 9, as shown in FIG. 10. The fish cage 9 may be provided with a plurality of charging stations 81. In a further alternative embodiment, each underwater vehicle 8 may be provided with a plurality of camera housings 3, as shown in FIG. 10. There may be one underwater vehicle 8 with a plurality of camera housings 3 in one fish cage 9.

Figure 4:
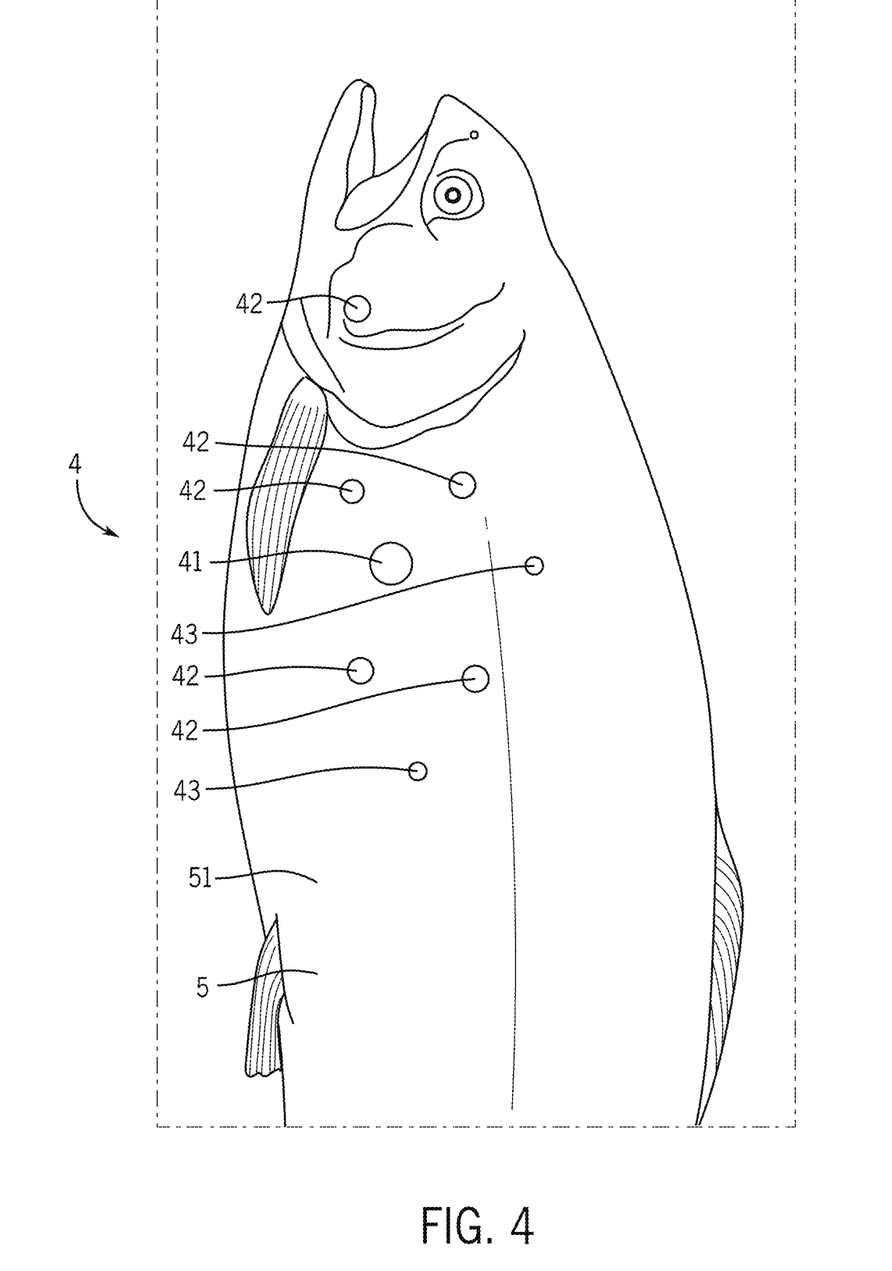
FIG. 4 shows a photograph of a salmon, in which markers of different sizes have been placed on the surface of the salmon.

Three different markers 4, 41-43 were placed on an object 5. The object 5 was a dead salmon (S. salar) 51, see FIG. 4. The first marker 41 was circular with a diameter of 12.0 mm and a height of 5.7 mm. The second marker 42 was circular with a diameter of 7.0 mm and a height of 3.1 mm. The third marker 43 was circular with a diameter of 5.1 mm and a height of 2.2 mm. One first marker 41, five second markers 42 and two third markers 43 were used. The object 5 with markers 4 was depicted with a distance of 60 cm between the object 5 and the camera group 2.

Figure 5:
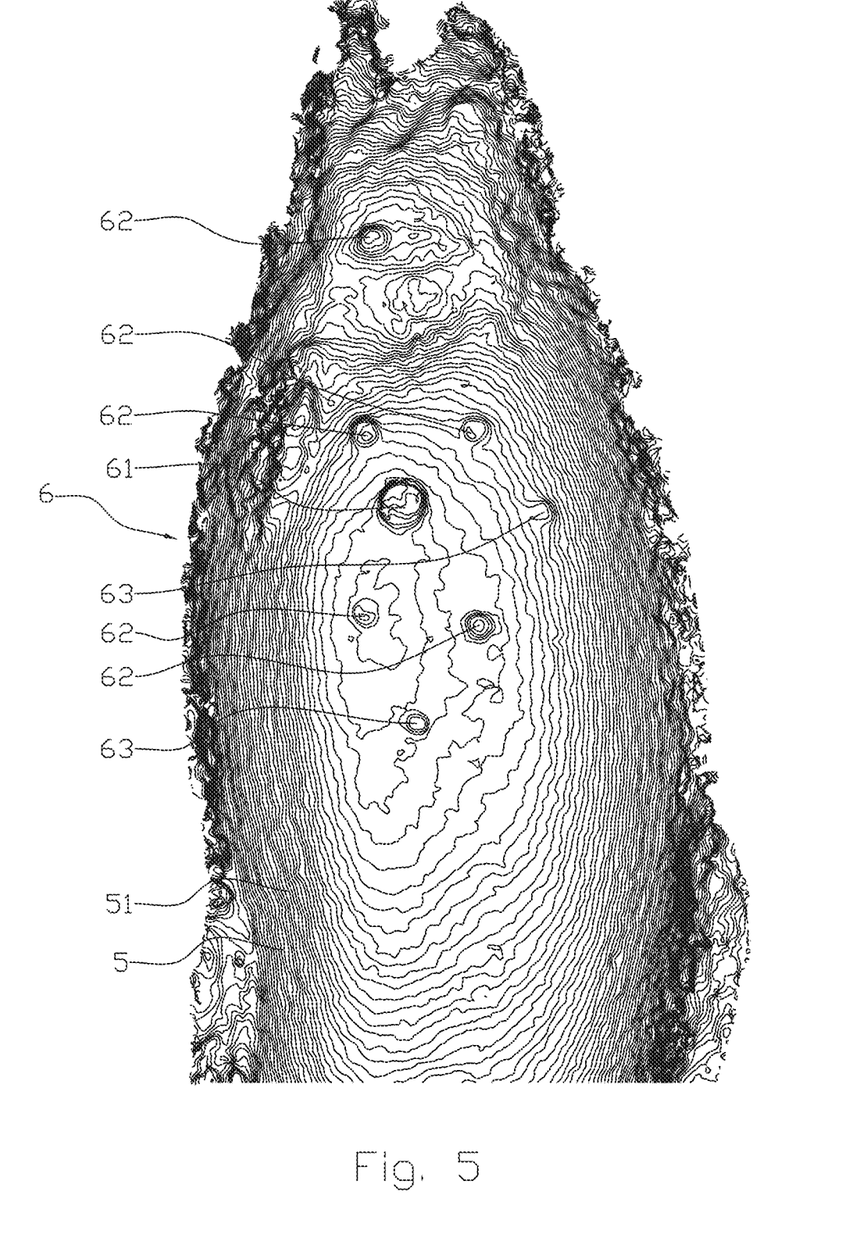
FIG. 5 shows a three-dimensional representation of the salmon shown in FIG. 4 based on digital close-range photogrammetry.

The result based on digital close-range photogrammetry is shown in FIG. 5 as a three-dimensional model 6. The markers 41-43 appear clearly as raised structures 61-63 on the fish skin 55. FIG. 5 shows that three-dimensional modelling based on digital close-range photogrammetry is well suited for observing and counting external fish parasites. The method may also be combined with image recognition. A combination like that makes it possible to detect and identify even smaller objects. A high-resolution camera 21 makes it possible to observe such raised structures at a larger distance.

Figure 6:
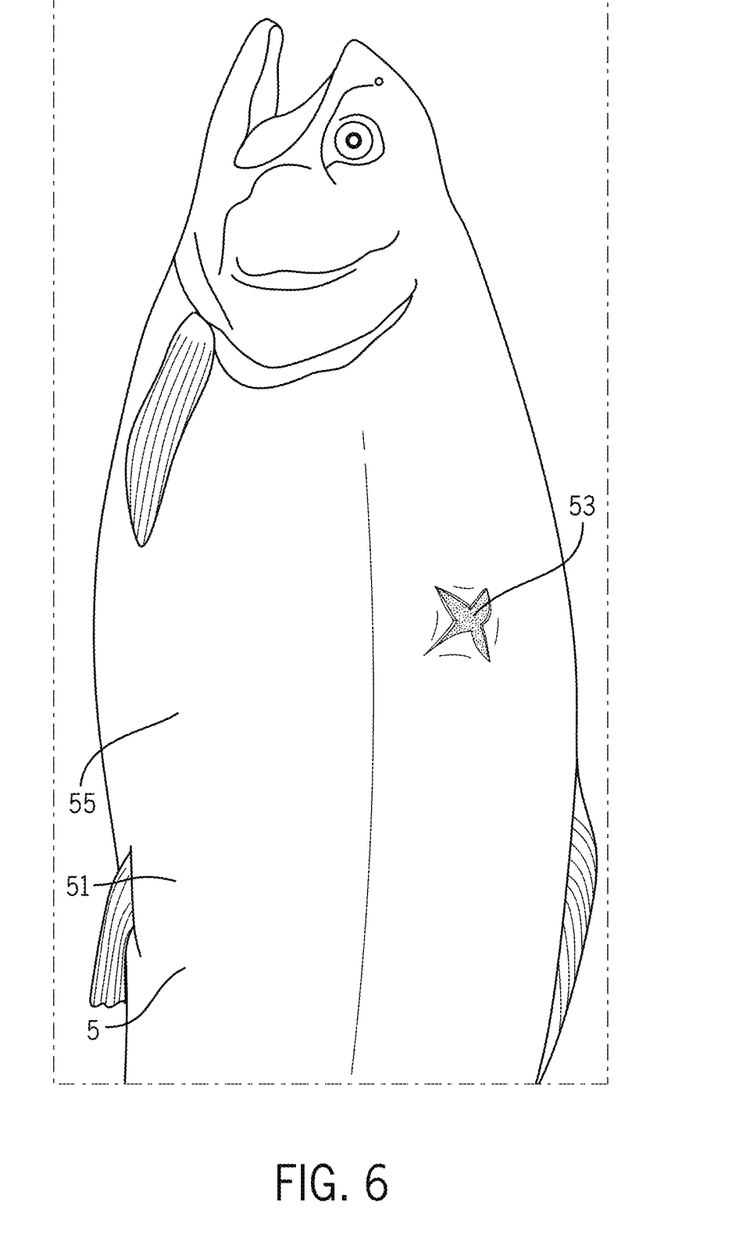
FIG. 6 shows a photograph of the same salmon as in FIG. 4, where a simulated damage has been made in the skin of the fish.
Figure 7:
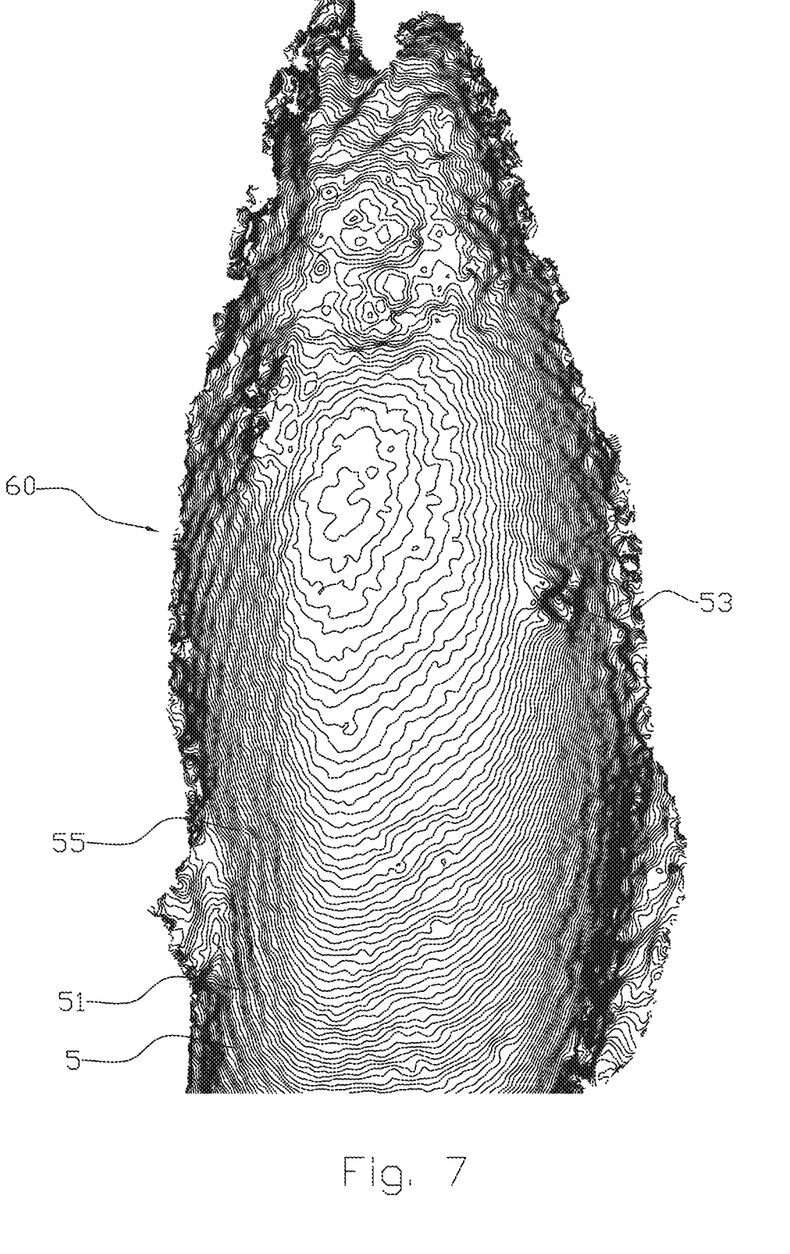
FIG. 7 shows a three-dimensional representation of the salmon shown in FIG. 6 based on digital close-range photogrammetry.
Figure 8:
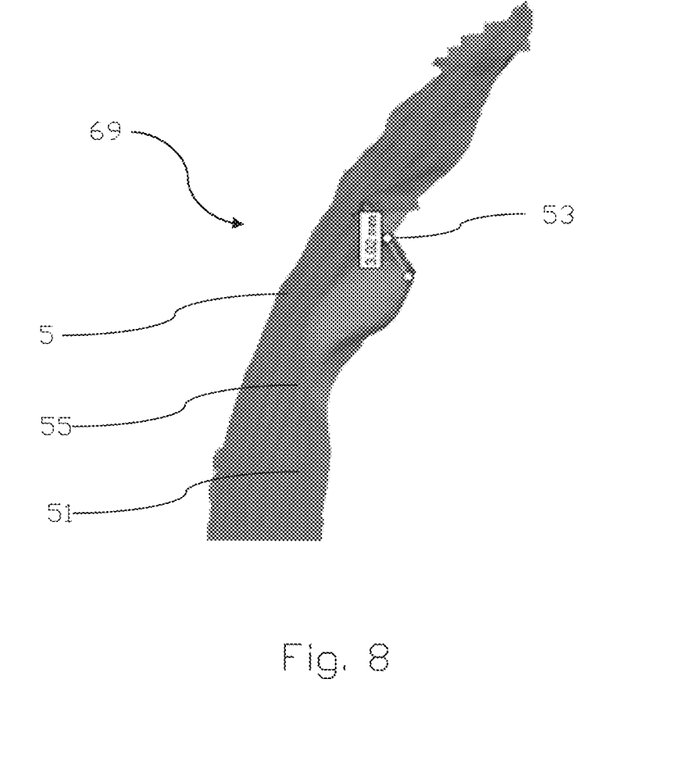
FIG. 8 shows a processed three-dimensional representation of the damage shown in FIG. 6 seen towards the head of the fish.

A simulated 53 damage was inflicted on the dead salmon 51 by placing two orthogonal cuts in the fish skin 55, see FIG. 6. Each cut was about 2 cm long and 3-4 mm deep. The result based on digital close-range photogrammetry is shown in FIG. 7 as a three-dimensional model 60. The simulated damage 53 appears clearly as a structure in the three-dimensional model 60. The basic data may also be used to form a three-dimensional model 69 seen from another viewing angle, as shown in FIG. 8. As the distances between the cameras 21 are known, the size of the damage 53 may be indicated in the three-dimensional model 69 as shown.

The central data-processing unit may be arranged to present the calculated three-dimensional model 6, 60 together with, and simultaneously with, a photographic image representation of the object 5 to an observer. The calculated three-dimensional model 6, 60 may be presented with markings for structures 61-63 deviating from a smooth surface. The observer may compare the three-dimensional model 6, 60 with the photograph to decide whether the data-processing unit marks correctly. The method may also be used for machine learning.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A system for in-situ monitoring and recording of fish health of fish in a fish cage, the system comprising:
    at least one camera housing,
        wherein the camera housing is provided with a camera group comprising at least two cameras arranged to take synchronized pictures for digital close-range photogrammetry; and
    a central data-processing unit, the central data-processing unit being arranged to:
        calculate a three-dimensional model of an object photographed synchronously by the at least two cameras; and
        report a number of structures deviating from a smooth surface of the object in the three-dimensional model.

2. The system in accordance with claim 1, wherein the camera group comprises a video surveillance camera.

3. The system in accordance with claim 1, wherein the camera housing comprises two camera groups.

4. The system in accordance with claim 1, wherein the camera housing is attached to an underwater vehicle.

5. The system in accordance with claim 4, wherein the underwater vehicle is an autonomous underwater vehicle.

6. The system in accordance with claim 1, wherein the system comprises at least two camera housings attached to an underwater vehicle.

7. The system in accordance with claim 1, wherein the system comprises communication means for wireless transmission of acquired data from the at least two cameras to the central data-processing unit.

8. A fish cage comprising a system for in-situ monitoring and recording of fish health of fish in a fish cage, the system comprising:
    at least one camera housing,
        wherein the camera housing is provided with a camera group comprising at least two cameras arranged to take synchronized pictures for digital close-range photogrammetry; and a central data-processing unit, the central data-processing unit being arranged to:
  calculate a three-dimensional model of an object photographed synchronously by the at least two cameras; and
  report a number of structures deviating from a smooth surface of the object in the three-dimensional model,
wherein the fish cage further comprises a charging station for an underwater vehicle.

9. The fish cage provided with a system in accordance with claim 8, wherein the fish cage is provided with two underwater vehicles, and each underwater vehicle is provided with at least one camera housing.

10. A method for in-situ monitoring and recording of fish health of fish in a fish cage, wherein the method comprises the steps of:
  providing a system for in-situ monitoring and recording of fish health of fish in a fish cage, the system comprising:
    at least one camera housing,
      wherein the camera housing is provided with a camera group comprising at least two cameras arranged to take synchronized pictures for digital close-range photogrammetry; and
    a central data-processing unit, the central data-processing unit being arranged to:
      calculate a three-dimensional model of an object photographed synchronously by the at least two cameras; and
      report a number of structures deviating from a smooth surface of the object in the three-dimensional model;
  synchronously photographing an object in the fish cage with the cameras of the camera group;
  processing the data acquired from the system in the central data-processing unit;
  calculating a three-dimensional model of the photographed object;
  analyzing the three-dimensional model for structures deviating from the smooth surface of the object and counting the number of such structures; and
  reporting the number of such structures.

11. The method in accordance with claim 10, wherein the method further comprises calculating and reporting the size of the structures.

12. The system in accordance with claim 1, wherein the object comprises a fish having skin, the smooth surface of the object corresponds to a surface of the skin of the fish, and the structures deviating from the smooth surface of the object in the three-dimensional model comprises at least one of the following: an external fish parasite, or a wound in the skin of the fish.

13. The system in accordance with claim 1, wherein the structures deviating from the smooth surface comprise structures that are raised above the smooth surface in the three-dimensional model.

14. The fish cage in accordance with claim 8, wherein the object comprises a fish having skin, the smooth surface of the object corresponds to a surface of the skin of the fish, and the structures deviating from the smooth surface of the object in the three-dimensional model comprises at least one of the following: an external fish parasite, or a wound in the skin of the fish.

15. The fish cage in accordance with claim 8, wherein the structures deviating from the smooth surface comprise structures that are raised above the smooth surface in the three-dimensional model.

16. The method in accordance with claim 10, wherein the object comprises a fish having skin, the smooth surface of the object corresponds to a surface of the skin of the fish, and the structures deviating from the smooth surface of the object in the three-dimensional model comprises at least one of the following: an external fish parasite, or a wound in the skin of the fish.

17. The method in accordance with claim 10, wherein the structures deviating from the smooth surface comprise structures that are raised above the smooth surface in the three-dimensional model.

* * * * *